United States Patent
Berionne et al.

(10) Patent No.: US 9,420,063 B2
(45) Date of Patent: Aug. 16, 2016

(54) SYSTEM AND METHOD FOR PRIORITIZING REQUESTS TO A SIM

(71) Applicant: QUALCOMM Incorporated, San Diego, CA (US)

(72) Inventors: Michele Berionne, San Diego, CA (US); Vivek Shankar, Bangalore (IN); K. Shreyas Hegde, San Diego, CA (US); J. Alfredo Ruvalcaba, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/918,295

(22) Filed: Oct. 20, 2015

(65) Prior Publication Data

US 2016/0044134 A1 Feb. 11, 2016

Related U.S. Application Data

(62) Division of application No. 13/303,886, filed on Nov. 23, 2011, now Pat. No. 9,247,023.

(60) Provisional application No. 61/512,356, filed on Jul. 27, 2011.

(51) Int. Cl.
*H04M 3/00* (2006.01)
*H04L 29/08* (2006.01)
*H04L 12/861* (2013.01)

(52) U.S. Cl.
CPC .............. *H04L 67/327* (2013.01); *H04L 49/90* (2013.01); *H04L 67/322* (2013.01)

(58) Field of Classification Search
CPC ..................... H04M 2250/14; H04M 1/72525; H04M 1/72522; H04W 88/02; H04W 8/183; H04W 12/06; H04W 8/245; H04W 24/02; H04W 48/18; H04W 48/16; H04W 8/16; H04W 48/20
USPC .......................... 455/414.1, 418–420, 422.1, 455/435.1–435.3, 550.1, 556.1, 556.2, 557, 455/558
See application file for complete search history.

(56) References Cited

U.S. PATENT DOCUMENTS

| | | | |
|---|---|---|---|
| 6,278,885 B1 | 8/2001 | Hubbe et al. | |
| 7,957,521 B2 * | 6/2011 | Taylor | ................... H04M 15/00 379/142.06 |
| 2003/0214948 A1 | 11/2003 | Jin et al. | |

(Continued)

FOREIGN PATENT DOCUMENTS

| | | |
|---|---|---|
| CN | 101765830 A | 6/2010 |
| EP | 1773079 A1 | 4/2007 |

(Continued)

OTHER PUBLICATIONS

International Search Report and Written Opinion—PCT/US2012/048640—ISA/EPO—Oct. 22, 2012.

*Primary Examiner* — Nhan Le
(74) *Attorney, Agent, or Firm* — Howard Seo

(57) ABSTRACT

The method and system relate to prioritizing access and shaping traffic to the SIM such that the requests to the SIM that pertain to registering the wireless mobile device on a network are given a higher priority than other requests to the SIM. The higher priority requests that relate to registering the mobile device on a network may be processed by the SIM prior to at least one other request that is not related to registering the mobile device on the network.

15 Claims, 3 Drawing Sheets

(56) References Cited

U.S. PATENT DOCUMENTS

| | | | |
|---|---|---|---|
| 2004/0151114 A1* | 8/2004 | Ruutu | H04L 29/06 370/230 |
| 2004/0246937 A1 | 12/2004 | Duong et al. | |
| 2005/0101324 A1* | 5/2005 | Chambers | H04W 72/10 455/435.3 |
| 2009/0065582 A1* | 3/2009 | Kon | G06K 7/0008 235/439 |
| 2009/0253405 A1* | 10/2009 | Yang | H04M 15/00 455/406 |
| 2010/0037230 A1 | 2/2010 | Potonniee et al. | |
| 2010/0175067 A1 | 7/2010 | Appe et al. | |
| 2012/0174144 A1 | 7/2012 | Flores et al. | |
| 2013/0029726 A1 | 1/2013 | Berionne et al. | |

FOREIGN PATENT DOCUMENTS

| | | |
|---|---|---|
| EP | 2053826 A2 | 4/2009 |
| EP | 2129172 A1 | 12/2009 |
| JP | 2004519877 A | 7/2004 |
| JP | 2004364309 A | 12/2004 |
| JP | 2006065867 A | 3/2006 |
| JP | 2006512678 A | 4/2006 |
| JP | 2007502069 A | 2/2007 |
| JP | 2009159573 A | 7/2009 |
| JP | 2010026815 A | 2/2010 |
| WO | 2010070373 A1 | 6/2010 |

\* cited by examiner

SYSTEM AND METHOD FOR PRIORITIZING REQUESTS TO A SIM

CLAIM OF PRIORITY UNDER 35 U.S.C. §119

The present Application for Patent claims priority to Provisional Application No. 61/512,356 entitled "System and method for prioritizing requests to a SIM" filed Jul. 27, 2011, and assigned to the assignee hereof and is hereby expressly incorporated by reference herein.

CLAIM OF PRIORITY UNDER 35 U.S.C. §120

The present Application for Patent is a divisional of patent application Ser. No. 13/303,886 entitled "SYSTEM AND METHOD FOR PRIORITIZING REQUESTS TO A SIM" filed Nov. 23, 2011, pending, and assigned to the assignee hereof and hereby expressly incorporated by reference herein.

BACKGROUND

1. Field

The features described below relate generally to reducing delays in acquiring service for a mobile equipment (ME). Examples of ME may include, but are not limited to, a cell phone, smart phone, tablet computer, laptop or other portable devices. More specifically, various embodiments are directed to optimization systems and methods that prioritize access to a SIM (Subscriber Identity Module) to reduce delays in acquiring services from a network. Services include but are not limited to voice, data, GPS, or text.

2. Background

A Subscriber Identity Module (SIM), such as but not limited to, a Removable User Identity Module (R-UIM), CDMA Subscriber Identity Module (CSIM), Universal Subscriber Identity Module (USIM), or GSM SIM, contains information relating to a user of a ME. A typical ME may take the form of, but is not limited to, a cellular radiotelephone, satellite radiotelephone, a PCMCIA card incorporated within a computer, a PDA equipped with wireless communication capabilities, a smart phone, a tablet computer or the like.

A SIM typically includes a controller and memory housed in a card-like structure. The memory may contain user information including, for example, a subscriber/user identifier, a phonebook providing a stored bank of telephone numbers, messages, billing codes, encryption sequences for secure wireless data communication, and other useful information that can be retrieved during the use of the ME. The memory also may store applications that are accessed by the ME, e.g., for over-the-air service provisioning, cryptography, web browsing, or mobile commerce.

A SIM includes a relatively simple electrical interface, including an input/output (I/O) port for exchanging serial data with another device such as an ME, a clock input for receiving an external clock signal, and a reset input for receiving a reset signal. A SIM receives power from the device in which it is installed.

All requests to a SIM are queued by the software controlling the SIM because the SIM processes only one request at a time. The requests to the SIM are sent in a queue and are processed using a "first in, first out" (FIFO) algorithm. The ISO interface used to communicate with the SIM can be slower (e.g. milliseconds) than the processing speeds of most MEs (e.g. microseconds or nanoseconds). Accordingly, the SIM may introduce delays while processing the requests. Access to data needed for registration and/or authentication requests directed to the SIM may wait for other modules that may be accessing the SIM with other types of requests. The delays caused by the other modules and the FIFO queue may prevent the ME from registering and initiating a phone call.

Multiple network access applications may be initialized one after another on one SIM and each application being used to register with a different network, such as but not limited to, UICC (Universal IC cards) cards with USIM (Universal Subscriber Identification Module) and CSIM (CDMA Subscriber Identity Module) to acquire LTE and 1× networks. New SIM cards with multiple network access applications have a larger number of files than the number of files in the SIM cards of the past. UICC cards with multiple applications can introduce additional delays. For example, if the applications are initialized in sequence, such as, the request for a first initialized application is received before the second application is initialized, the first initialized application may request data which may create a long queue of operations. The delay in registering the ME to the network with the 2nd application can be long. Various embodiments are directed to optimization systems and methods that prioritize access to a SIM in ME to reduce service acquisition delays.

SUMMARY

Embodiments of methods and systems for prioritizing requests to a SIM are described in greater detail below. The embodiments described below relate to prioritizing access and shaping traffic to the SIM such that the requests related to registering the ME on a network are given a higher priority than other requests to the SIM. The higher priority requests that relate to registering the ME on the network may be processed by the SIM prior to at least one other request that is not related to registering the ME on the network.

An example embodiment includes a method for prioritizing the requests received from multiple modules on the ME to access the functionalities of a SIM. The prioritizing of the requests may reduce service acquisition delays.

Another example embodiment includes a system with a wireless communication device configured to receive a SIM card and a queue management logic located in the wireless communication device configured to prioritize requests to the SIM card.

Another example embodiment includes a non-transitory computer implemented storage media configured to store a program product that, when executed on at least one processor performs a method that includes prioritizing service acquisition requests ahead of other types of requests to be sent to a SIM that is detachable to a mobile device.

DETAILED DESCRIPTION

Figure 1:
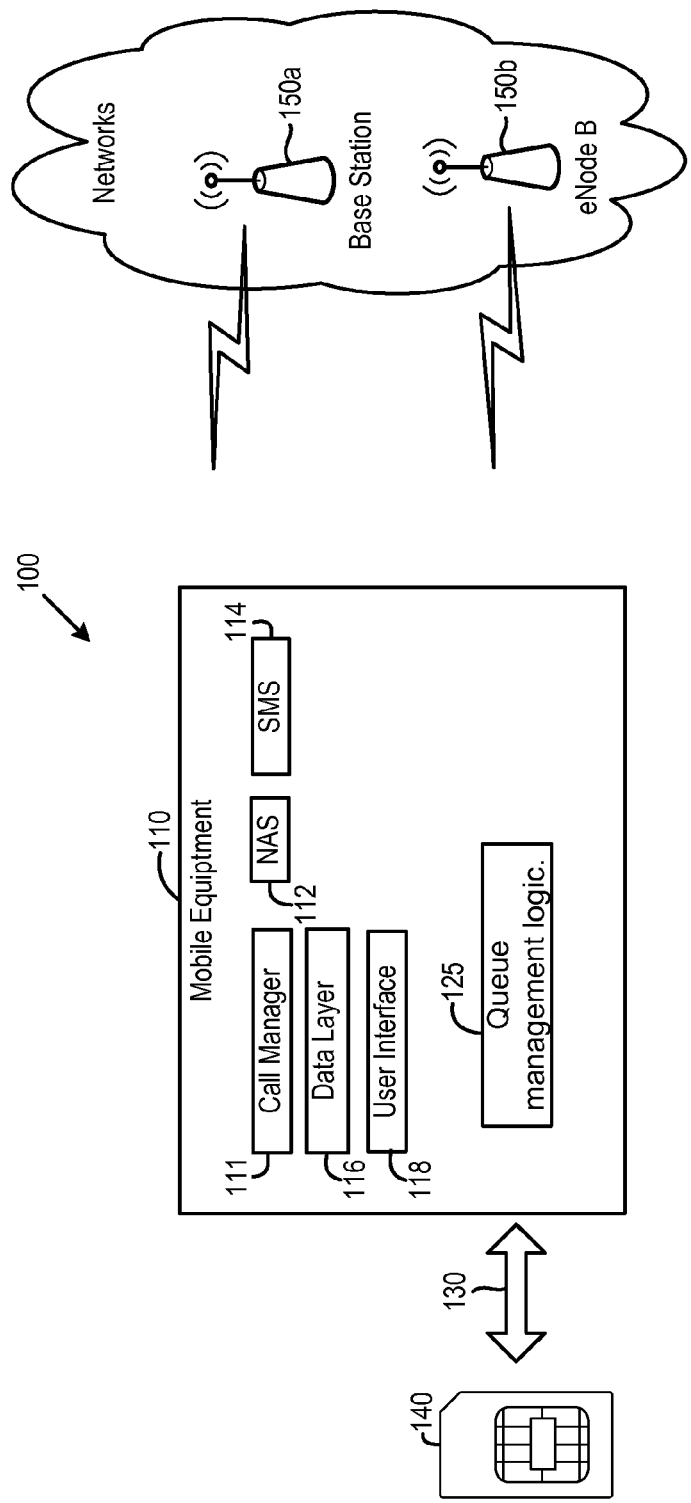
FIG. 1 is a schematic diagram of a wireless data processing system according to an example embodiment.

Referring to FIG. 1, FIG. 1 is a schematic diagram of a wireless data processing system 100 according to an example embodiment. FIG. 1 shows a data processing system 100 that is used by mobile equipment 110 to connect to various network(s) including base stations 150a and eNodeB 150b. The network(s) provide services or access to services that may be used by the mobile equipment 110. In an example embodiment, the network(s) allow the mobile equipment 110 to perform voice communications with other mobile equipment. In another embodiment, the networks may allow the mobile equipment 110 to access other services, such as but not limited to, the Internet, Mobile Applications, GPS, SMS and the like.

In order to access the services provided by the networks the mobile equipment 110 must register with the networks. The mobile equipment 110 may need to register with a plurality of networks for different services. For example, the mobile equipment 110 initiates registration with various networks upon initial power up, exiting airplane mode or a reset of the SIM. Registration with a network includes authenticating that the mobile equipment 110 has the appropriate credentials to access the services provided by the network. For example, prior to initialing a telephone conversation the mobile equipment 110 may have to register with the base station 150a. The registration information that the mobile equipment 110 provides to the base station 150a may be stored on the SIM 140. The mobile equipment 110 may access and/or decrypt the registration information from the SIM 140 and provide the registration information to the base station 150a. In turn the base station 150a may provide the mobile equipment 110 with identification, scheduling, frequency, and/or bandwidth information to enable future communications between the mobile equipment 110 and the base station 150a.

The mobile equipment 110 includes a plurality of components that may each be configured to access the SIM 140. For example, the mobile equipment 110 includes call manager 111, NAS (Non-Access Stratum) 112, SMS 114, data layer 116, and user interface 118. The mobile equipment 110 may also include ISO interface 130 that enables communication with the SIM 140.

The call manager 111 is configured to facilitate incoming and outgoing voice communications. For example, prior to the user making a voice call to another phone, the call manager 111 in conjunction with 1× call processing may authenticate the mobile equipment 110 with the base station 150a. The 1× call processing may send a command to the ISO interface 130 to provide authentication codes to send to the base station 150a. Since the request from the 1× call processing is to receive service acquisition, the queue management logic 125 may identify the command as being related to service acquisition. The queue management logic 125 may have access to a lookup table, algorithm or the like, that identifies commands or data that are related to service acquisition. Since the command is related to service acquisition the queue management logic 125 may prioritize the request from the 1× call processing as higher priority request. The higher priority requests to the SIM 140 may be placed earlier in the SIM processing queue.

The NAS (non-access stratum) 112 authenticates the ME for UMTS related services. For example, if the user accesses the Internet or data on another network, the NAS may initiate the LTE authentication protocol with eNodeB 150b. In order to initiate the authentication protocol, the NAS 112 may acquire the most essential system information (including but not limited to frame timing, cell ID group, carrier frequency and the like) from the eNodeB 150b. The NAS 112 also sends a request to the SIM 140 in order to request authentication information from the SIM 140. Since requests from the NAS 112 are for service acquisition, the queue management logic 125 may prioritize those requests to be higher priority than other types of requests, from for example, the user interface 118. The higher prioritization performed by the queue management logic 125 generally occurs when the mobile equipment 110 is acquiring services. The higher prioritization leads to the SIM 140 processing the requests before the lower priority requests.

The SMS (Short Message Service) 114 processes all requests from the WMS (Wireless Messaging Service, as defined in the specification). The SMS 114 may be configured to store certain number of SMSs to the SIM 140. In an example embodiment, the commands related to the storage of the SMSs may be prioritized to be lower than service acquisition requests or may be placed in the regular queue by the queue management logic 125 in the next available slot.

The data layer 116 is configured to process requests related to mobile IP address management and the components that receive data such as but not limited to, PDN (Packet Data Network), APN (Access Point Name) and the like. In other embodiments, the data layer 116 may write data to the SIM 140 to store the IP address of the PDN or the IP context of the packet data. Some requests from the data layer 116 may be tagged by the data layer 116 as being related to service acquisition. The queue management logic 125 may give a higher priority to the requests that are tagged as being related to service acquisition requests.

Figure 3:
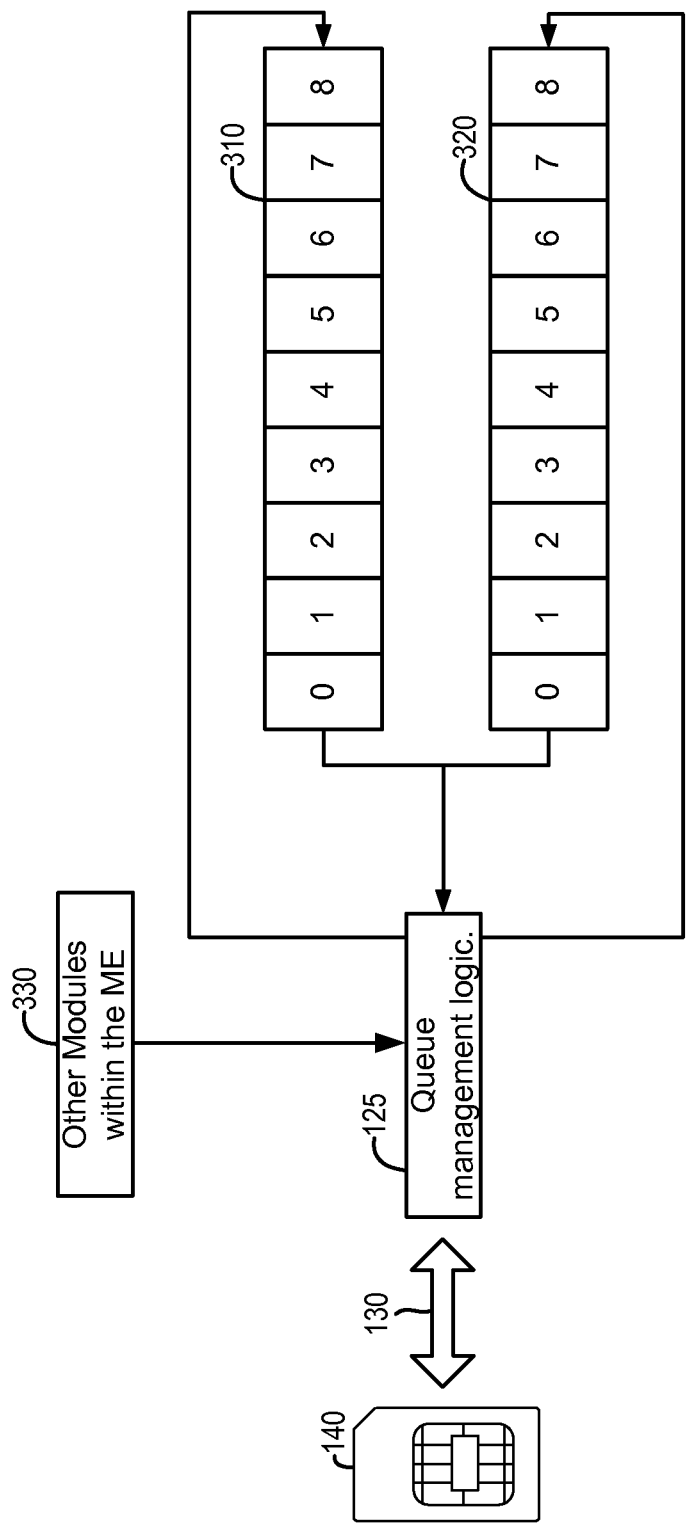
FIG. 3 is a schematic diagram of the queue management logic from FIG. 1 being configured to manage two request queues.

The user interface 118 may be configured to generate a graphical user interface for the user. The user interface 118 may request the user customization settings from the SIM 140 at bootup time. The requests for user customization settings would be considered to be lower priority by the queue management logic 125 and in one embodiment the request may be placed in the regular processing queue 320. The user interface 118 may also send a request to the SIM 140 to retrieve the preferred language setting and those requests would be placed in the regular processing queue 320 (See. FIG. 3) by the queue management logic 125.

The queue management logic 125 may have the ability to review each request at a bit level and determine the command or data that are in the request. Based on the review of each request, the queue management logic 125 may use a logic, such as but not limited to, a comparator that is configured to compare the received requests with predefined list of high priority requests in order to determine the placement of the requests within the queues. The queue management logic 125 is one of many modules that are located within the mobile equipment 110. The SIM 140 is replaceable by another SIM and is in electrical communication with the module within the mobile equipment 110. The queue management loci 125 is part of the mobile equipment 110 and is configured to prioritize requests that are intended to be processed by the SIM 140.

A request may comprise three parts, instruction, channel, and variable. Instructions include executable commands, the channel is the application within the SIM that is being accessed and the variable holds the source of the request, the parameters of the request and the data going into the SIM. The priority of a request may be determined based on the priority levels assigned to each of the three parts of the request. A set of example instructions may include but are not limited to, read, write, authenticate, as shown in Table 1 below. The priority of each request is predetermined and assigned to each instruction type based on whether the instruction is related to network acquisition or if the instruction originated from a module whose primary function includes service acquisition. Similarly, certain files within the SIM may be known to store data that relates to network acquisition and requests for those files may be given a higher priority. Similarly, certain variables or data relate to network acquisition and if the queue management logic 125 determines that those variables are being requested or being addressed then those requests may receive a higher priority.

TABLE 1

| Instruction | Channel | Variable |
|---|---|---|
| Read | 000 | Source of request: NAS. |
| Read | 001 | IMSI value. |
| Write | 010 | Cell ID number. |
| Authenticate | 011 | Code. |
| ... | ... | ... |

In one embodiment, the priority of a request may be a weighted average numerical priorities that are assigned to the instruction, channel and the variable for any given request. Based on the determined priority the request may be prioritized higher or lower in priority. If a request has a higher priority, then it will be placed ahead of the lower priority requests in the queue or placed in the higher priority queue 320. Other methods of determining priority may be used.

An example priority determination is described below. The priority of the "Read" instruction may not be high. However, since the "Read" instruction in row 1 relates to a "NAS" variable which relates to network authentication, the Read instruction would receive a high priority rating. Accordingly, any one of the instruction, channel or variable may influence the priority of a request.

In order to place the requests in the queues 310 and 320 as shown in FIG. 3, the queue management logic 125 may be configured to move requests out of a location within the queues 310 and 320 and place a new request to an empty memory location within the queue. Alternatively, the queue management logic 125 may be configured to switch two requests with each other within the queue.

In order to facilitate the switching of two requests, the queue management logic 125 may use a temporary memory space to allow temporary storage of the requests. The queue management logic 125 may include temporary storage memory in order to move requests from one memory location in a queue to another memory location in the queue. In an example embodiment the queue management logic 125 may switch the requests from memory location 1 to memory location 2 and move the request from memory location 2 to memory location 1. The queue management logic 125 may copy the request from memory location 2 to a temporary memory location and transfer the request from memory location 1 to memory location 2. After the transfer to memory location 2, the queue management logic may transfer the request from the temporary memory location to memory location 1. Other mechanisms or algorithms that move requests between memory locations may be utilized, such as but not limited to, registers, latches, or logical operators.

Various advantages may be realized by prioritizing the SIM requests. As mentioned above, the SIM 140 processes one request at one time and thus, the mobile equipment 110 may have to wait to register to the network Although a single mobile equipment 110 is shown in FIG. 1, other embodiments include a plurality of mobile equipment 110 that may access the base station 150a and eNodeB 150b. In yet other embodiments, the base station 150a and eNodeB 150b may be implemented as a single device capable of performing the functions of each respective device.

Figure 2:
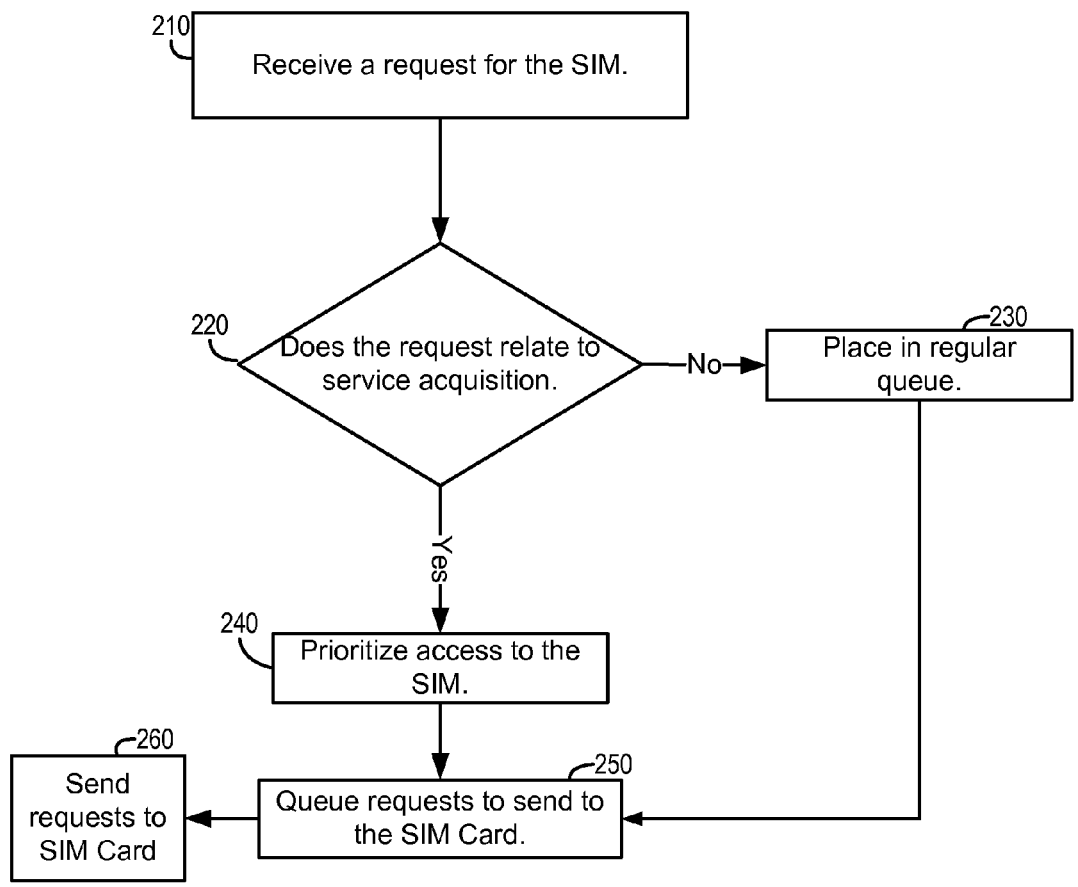
FIG. 2 is a method that may be implemented by the systems shown in FIG. 1.

Referring to FIG. 2, FIG. 2 is a method that may be implemented by the systems shown in FIG. 1. At step 210 the SIM 140 may receive a request for the card services layer. At step 220, the queue management logic 125 may determine whether the received request is related to service acquisition or is listed in the high priority table. If at step 220 it is determined that the request does not relate to service acquisition then the request is placed in a regular queue, at step 230. Alternatively, if the received request is related to service acquisition, then the request may be prioritized for access to the SIM 140, at step 240. In this embodiment, the queue management logic 125 may place the request for services acquisition in a high priority queue 310. At step 250, all requests may be placed in a queue to send to the SIM 140. Next at step 260, the request may be sent to the SIM 140.

At step 220, the queue management logic 125 may determine that a request is related to service acquisition by at least one of the following methods. The queue management logic 125 may review information in the command and/or data in the request to determine if the command or data is a match against high priority commands or data previously identified to be a high priority command or data list. A nonlimiting example of the higher priority request is a read operation of elementary file with subscriber identity or authentication requests from the network. In another embodiment, the queue management logic 125 may use an identifier in the request where the identifier is set by the module in the mobile equipment 110 to indicate a high priority request. In yet another embodiment, the queue management logic 125 may be preprogrammed to recognize and prioritize requests service acquisition higher than all other requests to the SIM 140. In yet another embodiment, the mobile equipment 110 may provide a plurality of queues that provide requests to the SIM processing module where one queue has the highest priority and the queue management logic 125 is configured to place service acquisition request in the highest priority queue.

FIG. 3 is a schematic diagram of the queue management logic 125 configured to manage two request queues. FIG. 3 shows queue management logic 125, ISO interface 130, SIM 140, two FIFO queues, high priority queue 310 and regular priority queue 320, and other ME modules 330. Other ME modules 330 may feed requests for the SIM 140 to the queue management logic 125. In one embodiment, all requests in the high priority queue 310 are processed before the requests in the regular priority queue 320. A request being processed meaning that the request is presented to the SIM 140 and a result is received from the SIM 140 or stored in the SIM 140. The queue management logic 125 may receive the requests from the mobile equipment 110 and based on the determination that the request is related to service acquisition, place the request in either the high priority queue 310 or the regular priority queue 320. In one embodiment, requests from the high priority queue 310 may be sent to the SIM 140 prior to any requests from the regular priority queue 320 are sent to the SIM 140. In another embodiment, a greater number of requests from the high priority queue 310 may be sent to the SIM 140 compared to the number of requests from the regular priority queue 320 that are sent to the SIM 140. In yet another embodiment, the queue management logic 125 may be configured to send two or more requests from the high priority queue 310 before sending one request from the regular priority queue to the SIM 140.

The queue management logic 125 may include temporary memory storage to store various requests that have been temporarily removed from the queues in order to place another request in place of the removed requests. In yet another embodiment, queues 310 and 320 may be implemented as a single queue and pointers or logics may be used prioritize the requests in the single queue according to the priorities described above. In another example embodiment, the queue management logic 125 may assign a numerical priority to each request and process the requests in numerical order based processing the request related to service acquisition prior to other requests. The numerical priority may be stored in the request.

The embodiments described above achieve various advantages. For example, the SIM may contain a large number of files, especially on multimode devices that include one set of files for 3GPP access and another set of files for 3GPP2 access. Some of these files are needed for registering the mobile equipment 110 to the networks. Other files that contain phone book short message, customizations, and so on may delay the registration of the ME to the networks. If the ME is not registered, a user may not be able to use the mobile equipment 110 to make a phone call or access data related services.

The embodiments described above achieve a faster registration of the ME with the network without modifying the ISO interface speed between the SIM and ME. At power-up, the race to access the SIM by all modules is avoided and the requests for network registration (i.e. service acquisitions) are processed by the SIM prior to other requests.

Embodiments of the queue management logic 125 are directed to reviewing each request and test whether the request is for a particular files (for example, IMSI) on the card that is known to be required for registration to the network or some operations (for example, authentication) that are known to be required for registration and give those requests a higher priority. In another embodiment, an identifier may be used within the request to allow the queue management logic 125 to recognize a high priority request.

The embodiments of the system and method for prioritizing access and shaping traffic to SIM to reduce service acquisition delay have been described with reference to drawings. The drawings illustrate certain details of specific embodiments that implement the systems, methods and programs of the various embodiments. However, describing the invention with drawings should not be construed as imposing on the invention any limitations that may be present in the drawings. The above described embodiments contemplate methods, systems and program products on any machine-readable media for accomplishing its operations. The embodiments may be implemented using an existing computer processor, or by a special purpose computer processor incorporated for this or another purpose or by a hardwired system.

As noted above, embodiments within the scope of the embodiments include program products comprising machine-readable media for carrying or having machine-executable instructions or data structures stored thereon. Such machine-readable media can be any available media, such as non-transitory storage media, that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, smart phones, data phones, wireless communication devices, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing devices in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the embodiments as defined in the appended claims. Such variations will depend on the software and hardware systems chosen and on designer choice. It is understood that all such variations are within the scope of the invention. Likewise, software and web implementations of the embodiments could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the embodiments as expressed in the appended claims.

What is claimed is:

1. A method, comprising:
   receiving, by a queue management logic, a subscriber identity module request, the queue management logic integrated into a wireless communication device having a subscriber identity module card, an interface configured to enable communication between the wireless communication device and the subscriber identity module card, a priority queue, and a regular priority queue;
   determining, by the queue management logic, if the subscriber identity module request is one of a service acquisition request or a non-service acquisition request, the service acquisition request configured to request access for the wireless communication device to a communications network;
   storing, by the queue management logic, the service acquisition request in the priority queue;
   storing, by the queue management logic, the non-service acquisition request in the regular queue; and
   sending, by the queue management logic, all of the service acquisition request in the priority queue to the interface before sending any of the non-service acquisition request to the interface.

2. The method of claim 1, further comprising sending, by the queue management logic, the non-service acquisition request in the regular queue to the interface only after sending all of the non-service acquisition request in the priority queue to the interface.

3. The method of claim 1, wherein the service acquisition request is configured to authenticate the wireless communication device with registration information stored in the subscriber identity module card.

4. The method of claim 1, wherein the service acquisition request is configured to enable voice communications between the wireless communication device and another device in the communications network.

5. The method of claim 1, wherein the determining if the subscriber identity module request is one of the service acquisition request or the non-service acquisition request is based on at least one of analyzing data in the subscriber identity module request or comparing a type of command in the subscriber identity module request against predetermined commands.

6. The method of claim 1, wherein the subscriber identity module request comprises an instruction, channel and variable.

7. The method of claim 1, wherein the determining if the subscriber identity module request is one of the service acquisition request or the non-service acquisition request is based on a module that originated the subscriber identity module request.

8. The method of claim 1, further comprising sending the subscriber identity module request in a prioritized order to the interface.

9. A non-transitory computer readable storage media configured to store a program product that, when executed on at least one processor performs a method comprising:
   receiving, by a queue management logic, a subscriber identity module request, the queue management logic integrated into a wireless communication device having a subscriber identity module card, an interface configured to enable communication between the wireless communication device and the subscriber identity module card, a priority queue, and a regular priority queue;
   determining, by the queue management logic, if the subscriber identity module request is one of a service acquisition request or a non-service acquisition request, the service acquisition request configured to request access for the wireless communication device to a communications network;
   storing, by the queue management logic, the service acquisition request in the priority queue;
   storing, by the queue management logic, the non-service acquisition request in the regular queue; and
   sending, by the queue management logic, all of the service acquisition request in the priority queue to the interface before sending any of the non-service acquisition request to the interface.

10. The non-transitory computer readable storage media of claim 9, further comprising sending, by the queue management logic, the non-service acquisition request in the regular queue to the interface only after sending all of the non-service acquisition request in the priority queue to the interface.

11. The non-transitory computer readable storage media of claim 9, wherein the service acquisition request is configured to authenticate the wireless communication device with registration information stored in the subscriber identity module card.

12. The non-transitory computer readable storage media of claim 9, wherein the service acquisition request is configured to enable voice communications between the wireless communication device and another device in the communications network.

13. The non-transitory computer readable storage media of claim 9, wherein the determining if the subscriber identity module request is one of the service acquisition request or the non-service acquisition request is based on at least one of analyzing data in the subscriber identity module request or comparing a type of command in the subscriber identity module request against predetermined commands.

14. The non-transitory computer readable storage media of claim 9, wherein the subscriber identity module request comprises an instruction, channel and variable.

15. The non-transitory computer readable storage media of claim 9, wherein the determining if the subscriber identity module request is one of the service acquisition request or the non-service acquisition request is based on a module that originated the subscriber identity module request.

* * * * *